June 17, 1924.
R. A. KAPS
UNIVERSAL JOINT
Filed Sept. 13, 1920
1,498,171
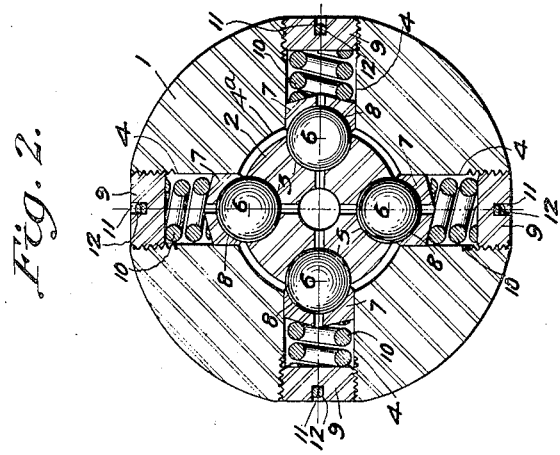
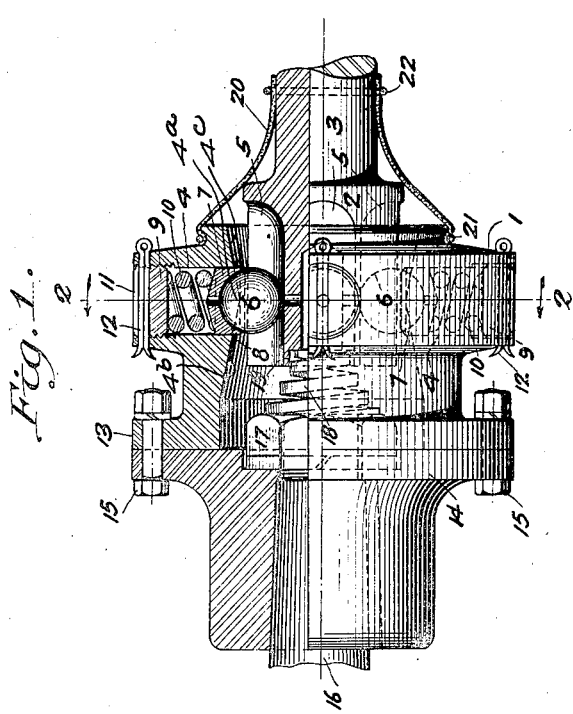
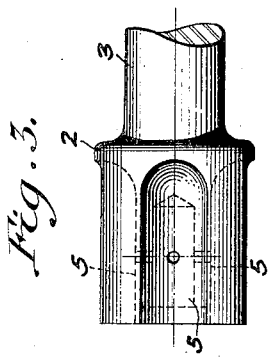
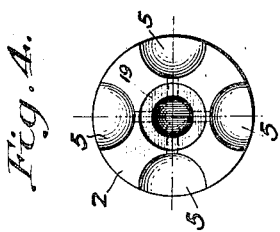
Inventor:
Richard A. Kaps
Witness
Francis E. Alden
By Wood & Wood
Attorneys Patented June 17, 1924.

1,498,171

UNITED STATES PATENT OFFICE.

RICHARD A. KAPS, OF DETROIT, MICHIGAN, ASSIGNOR TO THE CINCINNATI BALL CRANK COMPANY, OF CINCINNATI, OHIO, A CORPORATION OF OHIO.

UNIVERSAL JOINT.

Application filed September 13, 1920. Serial No. 409,917.

*To all whom it may concern:*

Be it known that I, RICHARD A. KAPS, a citizen of the United States, and residing at Detroit, in the county of Wayne and State of Michigan, have invented a new and useful Improvement in Universal Joints, of which the following specification is a full disclosure.

My invention relates to universal joints, and has for its main features the provision of a simple, compact, and efficient joint which obviates the use of the usual cross pivot member connection between the two shaft elements of the joint, and which may, and does in its preferred embodiment, hereinafter described, operate as a telescopic joint, as well.

The above features and certain other features hereinafter appearing are embodied in the preferred form of my invention hereinafter fully described and illustrated in the accompanying drawing, and are effected by certain novel constructions, combinations, and arrangements of parts particularly pointed out in the claims.

In the said drawing:

Figure 1 is a side elevation, partly in section, of my universal joint.

Figure 2 is a section on the line 2, 2, Fig. 1.

Figure 3 is a view in side elevation of an element of the joint hereinafter described.

Figure 4 is a view in end elevation of the same.

Like characters of reference indicate like parts in the various views.

In the drawings, 1 indicates an external ring member which is open at its axial center. This member is cylindrical in shape and provides a casing for the operating parts.

Disposed within the open center of the external member is an internal member 2 cylindrical in shape and preferably formed integrally with a shaft 3. The external member is provided with a plurality of radial bores 4, preferably four in number, disposed at spaced intervals, preferably equally spaced, about the axis thereof. The internal member is provided with a like number of outwardly facing grooves or ball races 5 extending longitudinally to the axis thereof and disposed at corresponding spaced intervals about the circumference. These grooves are semi-circular in cross section and of a slightly greater depth than the radius dimensions of the semi-circle, and a ball 6 of the proper diameter engages each groove for movement longitudinally therein. A socket member 7 is mounted for sliding movement in each bore 4 of the external member and has an inwardly facing spherical concave surface 8 engaging a ball 6. A plug 9 is screw threaded into the outer end of each bore 4, and a compression spring 10 is disposed within each bore between the plug and socket member to resiliently oppose outward radial movement of its socket member and ball, inward radial movement of the balls and socket members being opposed by the abutting relation of the balls with the grooves 5, and the springs on opposite sides of the internal member act against each other to yieldingly suspend the internal member. The centering of the internal member may be effected by adjusting the tension of the springs 10 by means of the plugs 9; adjustment for wear is also thus provided. The outer ends of the plugs are provided with diametrical slots 11 for engagement by a screw driver for adjustment and for engagement by cotter pins 12 extending through pairs of apertures in the external member disposed diametrically of the respective bores 4 adjacent their outer ends to fix the plugs 9 in their adjusted positions.

Each ball 6, in its engagement with its respective groove 5 or its respective socket member 7, as held in such engagement by the spring 10 and plug 9 thereof, constitutes a universal pivot joint connection between the external and internal member. As the internal and external members are pivotally moved out of axial alignment, the balls 6 move along the respective grooves 5 to accommodate such pivotal movement. Means is provided for increasing the angular radius of operation of the internal member with respect to the outer member without sacrificing compactness or increasing the size of the parts, and for limiting the degree of axial disalignment of the two members, which consists in providing a constricted portion $4^a$ at the interior of the external member, said constricted portion merging into flared conical portions $4^b$, $4^c$, at each side of said constriction. The end of the internal member and the grooves therein being straight, the outer periphery of the member will be engaged flatly against the conical surfaces to positively limit the angular relation between the external and internal members. When the internal member is pushed inwardly and the shafts sufficiently disaligned, the inner end of the internal member will act as a stop and flatly engage against the inner conical surface, conversely when the internal member is drawn outwardly, the flat surface of the inner member may be engaged with the outer conical surface.

In explanation, if the internal member 2 is tilted downwardly from the position shown in Fig. 1, the upper ball will move along its groove 5 toward the end of the internal member at the left and the opposite lower ball will move along its groove toward the right or shaft end of the internal member, the internal member pivoting on the other pair of balls which will not be moved along their grooves because the axis of this pivotal movement is coincident with the common axis of this pair of balls. The internal and external members may be referred to generically as driving and driven members concentrically and rotatively and pivotally connected by the balls in pairs disposed at right angles.

The springs 10 accommodate for torque and angular strains imparted to the balls and their sockets yieldingly urge the same toward the axis for maintaining the balls in their grooved key-ways. The springs 10 are so designed that they will fully compress and stop further movement of the balls outwardly at a point at which the balls cannot become disengaged from the grooves.

The grooves 5 are uniform from end to end and extend equidistant from the axis of the internal member to effect the uniform operation of the joint at all relative longitudinal positions of the external and internal members within the effective range of the engagement of the grooves with the balls, and the grooves are extended to permit the operation of the joint as a telescope joint within a practical range. Thus, the device operates as a combined universal and telescope joint.

The external member 1 extends beyond the joint proper on the end thereof opposite to the shaft 3 of the internal member and terminates in an outward extending circumferential flange 13 which is secured to the usual shaft flange 14 by bolts 15 in the usual manner. The shaft flange is secured to a shaft 16 in the usual manner, a nut 17 screw threaded on the end of the shaft clamping it in place on the shaft.

A compression spring 18 engages the nut 17 and an axial depression 19 formed in the adjacent end of the internal member 2 and tends to move the internal member outwardly, this being used where two of these joints are used in a "tumble shaft" assembly to maintain the internal members in proper longitudinal position.

The end of the external member opposite the flange 13 is grooved circumferentially on the enlarged end and a dust cover 20 of flexible material, such as leather, is secured therein by a wire ring 21, and the other end of the cover is secured to the shaft 3 by a wire ring 22, all as is usual.

While I have herein shown and particularly described the preferred embodiment of my invention, I do not wish to be limited to the precise details of construction shown, as changes may readily be made without departing from the spirit of my invention, but having thus described my invention, I claim as new and desire to secure by Letters Patent, the following:

1. A universal joint coupling comprising a tubular housing member closed at one end, and providing an internal constricted portion merging into flared conical portions at each side of said constricted portion, a plurality of spaced radial sockets in said housing aligned in a rotative plane and centrally intersecting said constricted portion, a shaft member disposed within said housing and providing outwardly facing straight longitudinal semi-cylindrical grooves, and balls engaging said grooves and corresponding sockets to flexibly and rotatably join said members, said flared portions permitting increased angular radius of operation of said members and limiting axial disalignment of the same.

2. A universal joint coupling comprising a cup-shaped member, providing an interiorly constricted portion merging into opposite conical flared portions at each side of said constricted portion, a plurality of spaced radial sockets in said housing aligned in a rotative plane and centrally intersecting said constricted portion, a shaft member disposed within said housing and providing outwardly facing straight longitudinal semi-cylindrical grooves, and balls engaging with said grooves and with corresponding spring pressed socket-blocks slidable in said sockets to flexibly and rotatably join said members, said flared portions acting to limit axial disalignment of said members.

In witness whereof, I hereunto subscribe my name, as attested by the two subscribing witnesses.

RICHARD A. KAPS.

Witnesses:
E. M. ELKAN,
A. JAHN.